US012779659B2

(12) United States Patent
Xie et al.

(10) Patent No.: US 12,779,659 B2
(45) Date of Patent: Nov. 3, 2026

(54) TOOL BOX

(71) Applicant: Bo Yu, Yantai City (CN)

(72) Inventors: Yongchao Xie, Yantai (CN); Huijie Li, Yantai (CN); Changlei Fan, Yantai (CN); Bo Yu, Yantai (CN)

(73) Assignee: Bo Yu, Yantai City (CN)

( * ) Notice: Subject to any disclaimer, the term of this patent is extended or adjusted under 35 U.S.C. 154(b) by 0 days.

(21) Appl. No.: 19/019,535

(22) Filed: Jan. 14, 2025

(65) Prior Publication Data

US 2026/0115888 A1 Apr. 30, 2026

(30) Foreign Application Priority Data

Oct. 24, 2024 (CN) ......................... 202422574281.3

(51) Int. Cl.
*B25H 3/00* (2006.01)
*B65D 25/10* (2006.01)
*B65D 25/16* (2006.01)

(52) U.S. Cl.
CPC ............. *B25H 3/006* (2013.01); *B25H 3/003* (2013.01); *B65D 25/108* (2013.01); *B65D 25/16* (2013.01); *B65D 2313/04* (2013.01)

(58) Field of Classification Search
CPC ...... B25H 3/006; B25H 3/003; B65D 25/108; B65D 25/16; B65D 2313/04
USPC ........ 206/379, 373, 749, 747, 467, 1.7, 443, 206/214, 45.2, 287, 292, 374, 378, 377, 206/45.23, 470; 220/4.21–4.24, 324, 220/4.01, 4.27, 500, 844, 520; 190/13 F, 190/16; 211/69, 168, 34, 70.6; D3/905, D3/283, 282, 273, 276; D9/426, 420; 221/34, 37; 269/286
See application file for complete search history.

(56) References Cited

U.S. PATENT DOCUMENTS 1,239,023 A * 9/1917 McElhinny .............. A47B 3/10 312/200
2,173,917 A * 9/1939 Ryan ........................ A47F 5/112 D6/310

(Continued)

FOREIGN PATENT DOCUMENTS

EP 2070832 A1 * 6/2009 ............. B65D 43/22

OTHER PUBLICATIONS

JAKEMY Screwdriver Set. (2023). Amazon.com Available at: https://www.amazon.com/Screwdriver-JAKEMY-Multi-Bits-Professional-Electronic/dp/BOBZVHM5YW?th=1 (Accessed: Mar. 6, 2026). (Year: 2023).*

*Primary Examiner* — Rafael A Ortiz
*Assistant Examiner* — Brijesh V. Patel
(74) *Attorney, Agent, or Firm* — The Sun IP Law

(57) ABSTRACT

The present application provides a tool box, including a first box body and a second box body which mate together, wherein the first box body is provided with a first bottom surface and a first mating surface; the second box body is provided with a second bottom surface and a second mating surface; and when the tool box is placed in an open state, the first bottom surface is placed on a table top to support the first box body, and an angle between the first mating surface and the first bottom surface is not less than 20° and not more than 90°; and the second bottom surface is placed on the table top to support the second box body, and an angle between the second mating surface and the second bottom surface is not less than 20° and not more than 90°.

10 Claims, 9 Drawing Sheets

(56) References Cited

U.S. PATENT DOCUMENTS

| | | | | | |
|---|---|---|---|---|---|
| 2,446,366 | A * | 8/1948 | Epps | B65D 5/6697 | D9/426 |
| 2,816,628 | A * | 12/1957 | Sidney | A47F 3/145 | 190/16 |
| 2,844,244 | A * | 7/1958 | Hanson | B65D 25/105 | 206/379 |
| 2,983,367 | A * | 5/1961 | Parmater | A45C 5/03 | 312/351 |
| 3,001,650 | A * | 9/1961 | Turner | A47F 7/08 | 190/16 |
| 3,186,556 | A * | 6/1965 | Forsstrom | B25H 3/003 | 211/74 |
| 3,410,698 | A * | 11/1968 | Sosin | B65D 1/34 | 426/106 |
| 3,426,890 | A * | 2/1969 | Bayer | B65D 43/164 | 206/379 |
| 3,583,556 | A * | 6/1971 | Wagner | A47B 81/00 | 269/286 |
| 3,937,389 | A * | 2/1976 | Wind | B65D 43/162 | 220/4.23 |
| 4,030,235 | A * | 6/1977 | Terzian | A63H 3/52 | 446/295 |
| 4,108,310 | A * | 8/1978 | Aldridge | A61B 5/022 | 600/490 |
| 4,189,054 | A * | 2/1980 | Liu | A47G 21/001 | 220/4.23 |
| 4,266,835 | A * | 5/1981 | Schmidt | B25H 3/02 | D3/905 |
| 4,294,299 | A * | 10/1981 | Dorsen | A45C 13/06 | 220/4.23 |
| 4,320,846 | A * | 3/1982 | Meyering | B25H 3/023 | 206/390 |
| 4,561,705 | A * | 12/1985 | Schafer | B25H 3/023 | 312/118 |
| 4,709,970 | A * | 12/1987 | Savoie | B25H 3/02 | 312/246 |
| 4,815,622 | A * | 3/1989 | Cramer | B65D 11/10 | 206/214 |
| 5,018,622 | A * | 5/1991 | Hartley | B65D 75/322 | 206/467 |
| 5,133,455 | A * | 7/1992 | Chow | B25H 3/06 | 206/374 |
| 5,143,215 | A * | 9/1992 | Hartley | B65D 25/22 | 206/467 |
| 5,176,272 | A * | 1/1993 | Ryan | B65D 43/162 | 220/4.23 |
| 5,205,413 | A * | 4/1993 | Cautereels | A45C 5/00 | 206/541 |
| 5,248,030 | A * | 9/1993 | Tarozzi | B25H 3/023 | 206/214 |
| 5,495,947 | A * | 3/1996 | Zarske | A63F 3/062 | 273/148 A |
| 5,562,208 | A * | 10/1996 | Hasler | B25F 1/00 | 206/373 |
| 5,628,400 | A * | 5/1997 | Feder | B25H 3/003 | 206/443 |
| 5,676,240 | A * | 10/1997 | Cziraky | B44D 3/00 | 220/520 |
| 5,676,253 | A * | 10/1997 | Hsu | B25H 3/023 | 220/520 |
| D412,061 | S * | 7/1999 | Yemini | D3/905 | |
| 6,026,973 | A * | 2/2000 | Der Kinderen | B65D 11/00 | 220/520 |
| 6,032,796 | A * | 3/2000 | Hopper | B25H 3/003 | 206/472 |
| 6,213,296 | B1 * | 4/2001 | Streich | B25H 3/003 | 206/480 |
| D444,300 | S * | 7/2001 | Leyshon | D3/282 | |
| 6,349,827 | B1 * | 2/2002 | Feder | B25H 3/003 | 206/443 |
| 6,619,482 | B1 * | 9/2003 | King | A61J 7/0069 | 220/520 |
| D502,869 | S * | 3/2005 | Clarke | D9/425 | |
| 6,913,143 | B2 * | 7/2005 | Yang | A45C 13/005 | 206/443 |
| D514,314 | S * | 2/2006 | Singh | D3/276 | |
| D516,312 | S * | 3/2006 | Chan | D3/273 | |
| 7,032,750 | B2 * | 4/2006 | Amtenbrink | B25H 3/003 | 206/379 |
| 7,243,815 | B2 * | 7/2007 | Coppedge | B65D 75/22 | 220/769 |
| D571,654 | S * | 6/2008 | Maroofian | D9/420 | |
| 7,445,120 | B2 * | 11/2008 | Brej | B65D 73/00 | 220/4.23 |
| D625,995 | S * | 10/2010 | Vovan | D9/429 | |
| 8,215,485 | B2 * | 7/2012 | Maroofian | B65D 75/24 | 206/508 |
| 8,499,955 | B2 * | 8/2013 | Vazquez | A47F 7/08 | 220/500 |
| 8,997,994 | B1 * | 4/2015 | Jung | A47B 81/00 | 206/541 |
| 9,610,680 | B2 * | 4/2017 | Diamond | B25H 3/003 | |
| 9,867,440 | B2 * | 1/2018 | Lawrenson | A45C 13/02 | |
| 9,918,533 | B2 * | 3/2018 | Copek | A45C 13/004 | |
| 9,938,038 | B2 * | 4/2018 | Pfeifer | B65D 5/4216 | |
| 10,993,516 | B2 * | 5/2021 | Pineiro | B43K 31/00 | |
| 11,008,132 | B1 * | 5/2021 | Mahler | B65D 5/5273 | |
| 11,110,591 | B2 * | 9/2021 | Chen | B25H 3/028 | |
| 2003/0075476 | A1 * | 4/2003 | Savoie | A47F 5/108 | 206/739 |
| 2003/0192808 | A1 * | 10/2003 | Clarizio | B82Y 10/00 | 206/575 |
| 2008/0190788 | A1 * | 8/2008 | Cziraky | B43M 99/00 | 206/214 |
| 2011/0259947 | A1 * | 10/2011 | Brittain | B65D 5/2038 | 493/162 |

* cited by examiner

TOOL BOX

CROSS REFERENCE TO RELATED APPLICATIONS

The present application claims the benefit of Chinese Patent Application No. 202422574281.3 filed on Oct. 24, 2024, the contents of which are incorporated herein by reference in their entirety.

FIELD OF THE INVENTION

Embodiments of the present application relate to the technical field of tool storage containers, in particular to a tool box.

BACKGROUND OF THE INVENTION

A tool box is a container for storing and carrying various tools, and is commonly used in various occasions such as home repair, gardening, automobile maintenance, electrical appliance repair, and electronic product overhaul.

For users who use a workbench for disassembly, assembly and maintenance work, in operation, the workbench is usually filled with various tool boxes, hand tools and articles. The tool boxes, hand tools and articles are conventionally placed in a middle front part of the workbench, and a rear part against a wall or a rear baffle of the workbench is relatively free, which results in a low space utilization rate at the rear part against the wall or the rear baffle of the workbench.

SUMMARY OF THE INVENTION

Embodiments of the present application provide a tool box to solve the technical problem of a low space utilization rate at a rear part against a wall or a rear baffle of a workbench.

Embodiments of the present application provide the following technical solutions to solve the above technical problem:

an embodiment of the present application provides a tool box, including a first box body and a second box body which mate together, wherein the first box body is provided with a first bottom surface and a first mating surface, the first mating surface being a surface on which a circumferential outer edge of an open end of the first box body is located;

the second box body is provided with a second bottom surface and a second mating surface, the second mating surface being a surface, mating with the first mating surface, of the second box body; and when the tool box is placed in an open state, the first bottom surface is opposite to a table top and placed on the table top, and an angle between the first mating surface and the first bottom surface is not less than 20° and not more than 90°; and the second bottom surface is opposite to the table top and placed on the table top, and an angle between the second mating surface and the second bottom surface is not less than 20° and not more than 90°.

Beneficial effects of the embodiments of the present application: when the tool box provided by the embodiments of the present application is placed in the open state, an opening of the tool box is inclined toward a user, thereby enabling the user to clearly observe tools inside the tool box at a glance when the tool box is placed at the rear part of the workbench, facilitating the user to take the tools; and when the tool box is placed in the open state, the first bottom surface of the tool box serves as a supporting surface of the first box body, is placed on a table top of the workbench, and is in contact with the table top of the workbench to support the first box body, and the first mating surface is inclined with respect to the first bottom surface, likewise, the second bottom surface of the tool box serves as a supporting surface of the second box body, is placed on a table top of the workbench, and is in contact with the table top of the workbench to support the second box body, and the second mating surface is inclined with respect to the second bottom surface. Compared with a tool box with a flat cuboid structure in the related art, the inner space of the first box body and the second box body is larger to allow a part of tools such as a screwdriver to be placed vertically or allow a liner to be placed obliquely (the liner is placed obliquely such that a tool placement surface of the liner is inclined at a certain angle). Therefore, when the tool box provided by the embodiments of the present application is placed at the rear part of the workbench, it is convenient for the user to clearly observe the tools in the tool box at a glance, thereby also facilitating the user to take the tools when the tool box is placed at the rear part of the workbench. Accordingly, the use of the tool box provided by the embodiments of the present application makes it possible to make reasonable use of the space of the workbench, improving the space utilization rate at the rear part against the wall or the rear baffle of the workbench.

In a possible embodiment, the tool box provided with a first side surface and a second side surface which are opposite to each other; and the first box body is rotatably connected to the second box body on the first side surface, and an opening of the first box body and an opening of the second box body are oriented the same when the tool box is placed in the open state.

In a possible embodiment, the first box body further includes a first rear side surface, the first rear side surface being located at a rear side of an open side of the first box body, the first rear side surface being adjacent to the first bottom surface, and the first rear side surface being perpendicular to the first bottom surface; and the second box body further includes a second rear side surface, the second rear side surface being located at a rear side of an open side of the second box body, the second rear side surface being adjacent to the second bottom surface, and the second rear side surface being perpendicular to the second bottom surface.

In a possible embodiment, the tool box has a cuboid structure, the first bottom surface, the second bottom surface, the first rear side surface and the second rear side surface are four side surfaces located between the first side surface and the second side surface, and the first side surface and the second side surface are square; and the angle between the first mating surface and the first bottom surface is 45°, and an angle between the second mating surface and the first bottom surface is 45°.

In a possible embodiment, the second side surface is provided with a latching structure configured to latch the first box body and the second box body together in a buckled state of the tool box.

In a possible embodiment, the first box body and the second box body are each provided with a tool placement site.

In a possible embodiment, a first liner is disposed within the first box body, the first liner being provided with at least one tool placement site for tools; and a second liner is disposed within the second box body, the second liner being provided with at least one tool placement site for tools.

In a possible embodiment, the tool placement site on the first liner includes a handle placement site in which a screwdriver handle is placed and a plurality of screwdriver bit placement sites in which screwdriver bits are placed;

the first liner is provided with a plurality of steps;

the handle placement site is located on a front side of the plurality of steps, and a side on which an end, close to the first bottom surface, of the first mating surface is located is the front side; and the plurality of the screwdriver bit placement sites are arranged in a plurality of rows and a plurality of columns, the number of rows of the screwdriver bit placement sites is the same as the number of the steps, one row of screwdriver bit placement sites is arranged on one step, and the screwdriver bit placement sites are configured to vertically place screwdriver bits.

In a possible embodiment, the tool placement site on the first liner further includes a magnetic plate placement site for placing a magnetic positioning plate, the magnetic plate placement site being a placement slot parallel to the first bottom surface, the magnetic plate placement site being located at a front side of the handle placement site.

In a possible embodiment, the second liner is mounted obliquely in the second box body, and an angle of inclination of the second liner with respect to the second bottom surface is the same as an angle of inclination of the second mating surface with respect to the second bottom surface; and the tool placement site on the second liner includes a pry bar placement site, a prying blade placement site, an elongated soft bar placement site, and a tweezer placement site.

In addition to the above technical problems solved by the present application, the technical features constituting the technical solutions and the beneficial effects brought about by the technical features of the technical solutions, other technical problems solved by the tool box provided by the present application, other technical features included in the technical solutions, and the beneficial effects brought about by the technical features will be described in further detail in the detailed description.

BRIEF DESCRIPTION OF DRAWINGS

The drawings herein are incorporated into and constitute part of the description, illustrating the embodiments conforming to the present application, and are used together with the description to interpret the principles of the present application.

DESCRIPTION OF REFERENCE SIGNS

Figure 1:
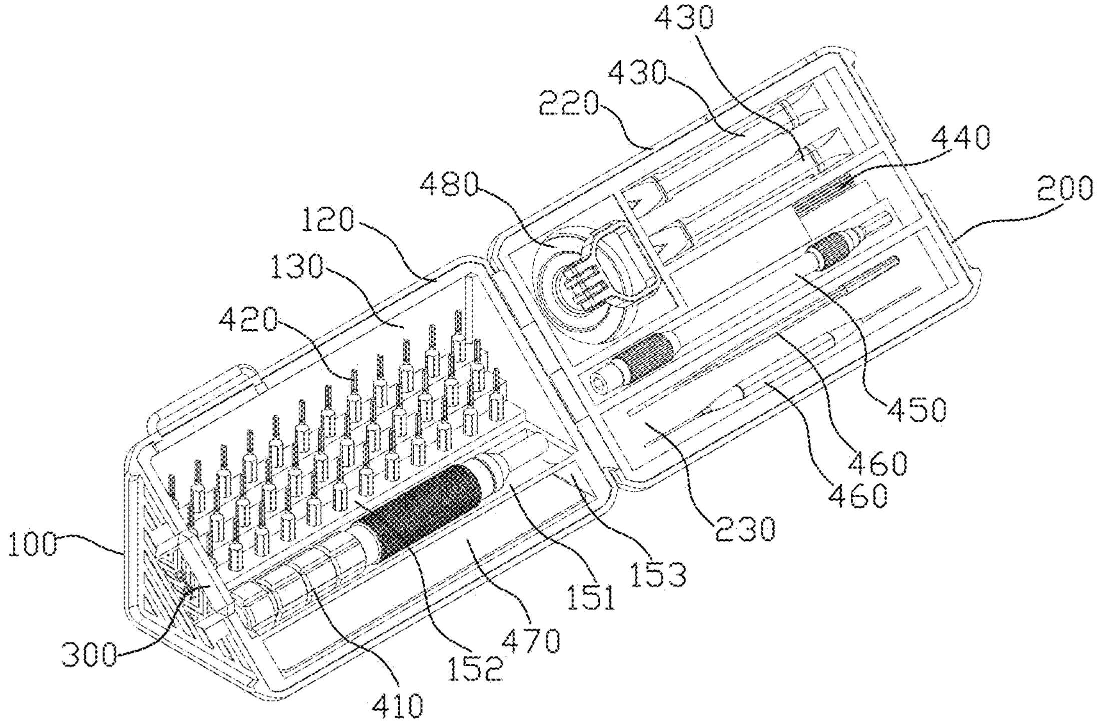
FIG. 1 is a schematic diagram of a tool box according to an embodiment of the present application placed in an open state.

10, first side surface; 20, second side surface;
100, first box body;
110, first bottom surface; 120, first mating surface; 130, first liner; 140, first rear side surface;
151, handle placement site; 152, step; 153, magnetic plate placement site;
200, second box body;
210, second bottom surface; 220, second mating surface; 230, second liner; 240, second rear side surface;
300, latching structure;
410, screwdriver handle; 420, screwdriver bit; 430, pry bar; 440, prying blade; 450, elongated soft bar; 460, tweezer; 470, magnetic positioning plate; and 480, screen suction cup.

By the above drawings, specific examples of the present application have been shown and will hereinafter be described in more detail. These drawings and written descriptions are not intended to limit the scope of the concept of the present application in any way, but rather to illustrate the concept of the present application by reference to specific embodiments for those skilled in the art.

DETAILED DESCRIPTION OF THE INVENTION

For users who use a workbench for disassembly, assembly and maintenance work, in operation, the workbench is usually filled with various tool boxes, hand tools and articles. The tool boxes, hand tools and articles are conventionally placed in a middle front part of the workbench, this is because in the related art, the tool box generally includes two box bodies which mate together, when the tool box is not in use, the two box bodies mate together during placed, and when the tool box is in use, the two box bodies are opened, the two box bodies are placed flat on the workbench with openings of the two box bodies facing directly above. When the tool box is placed in a rear part of the workbench, the tool box is relatively far away from the users, and due to the openings of the box bodies facing directly above, it is difficult for the users to quickly and clearly observe tools within the tool box for perspective reasons, which makes it inconvenient for the users to take the tools, and if the users want to take the tools placed in the tool box at the rear part of the workbench, the users usually lean forward and then habitually pull the tool box in a direction close to himself/herself, which may cause the objects located at the front of the tool box to fall, affecting the working efficiency of the users. Therefore, for ease of taking, and based on habits, the users often place tool boxes, hand tools, articles, and the like at the middle front part of the workbench, which makes a rear part against a wall or a rear baffle of the workbench relatively free, resulting in a low space utilization rate at the rear part against the wall or the rear baffle of the workbench.

In the present application, by improving the orientation of the opening of the tool box, the opening of the tool box is inclined toward the user, so that when the tool box is placed at the rear part of the workbench, the user can intuitively and clearly see the tools stored in the tool box, and it is convenient for the user to take the tools, thereby reasonably utilizing the space of the workbench and improving the space utilization rate at the rear part against the wall or the rear baffle of the workbench.

The technical solutions in the embodiments of the present application will be clearly and completely described below in conjunction with the accompanying drawings in the embodiments of the present application. Obviously, the described embodiments are only a part of the embodiments of the present application, rather than all of the embodiments. Based on the embodiments in the present application, all other embodiments obtained by those of ordinary skill in the art without inventive step belong to the scope of protection of the present application.

Figure 2:
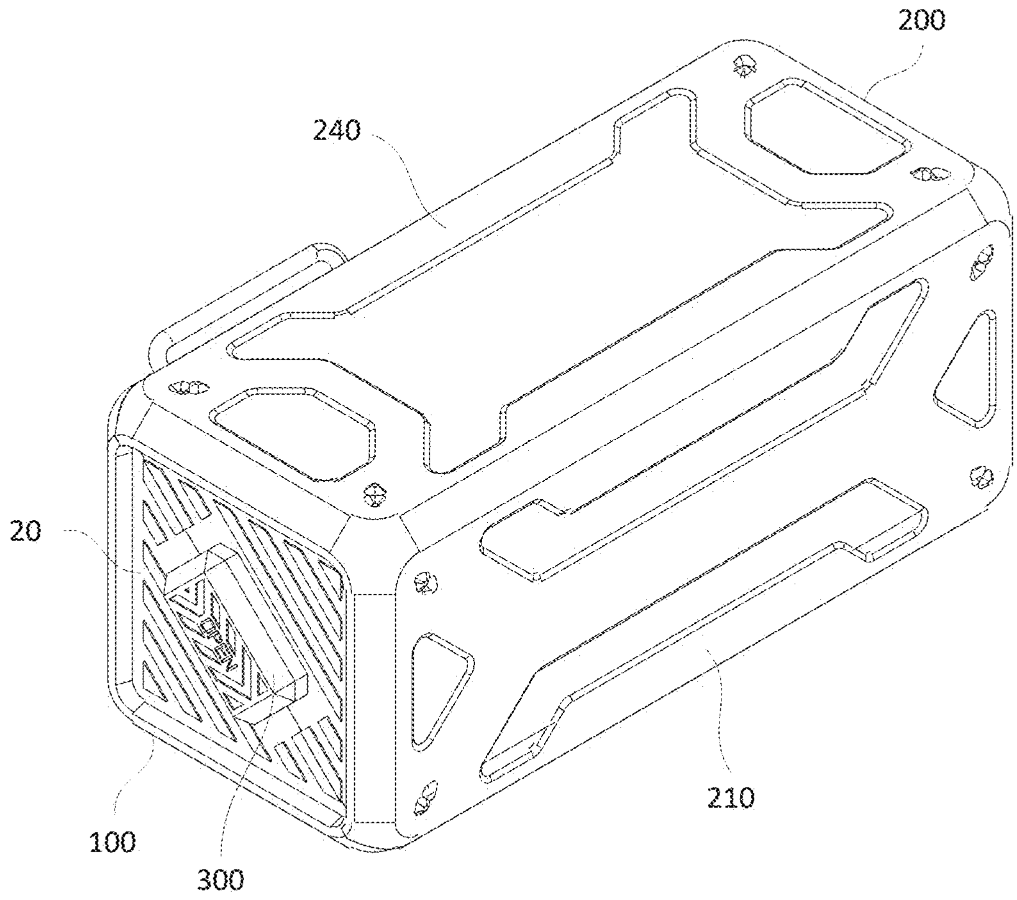
FIG. 2 is a schematic diagram of the tool box according to the embodiment of the present application in a closed state.
Figure 3:
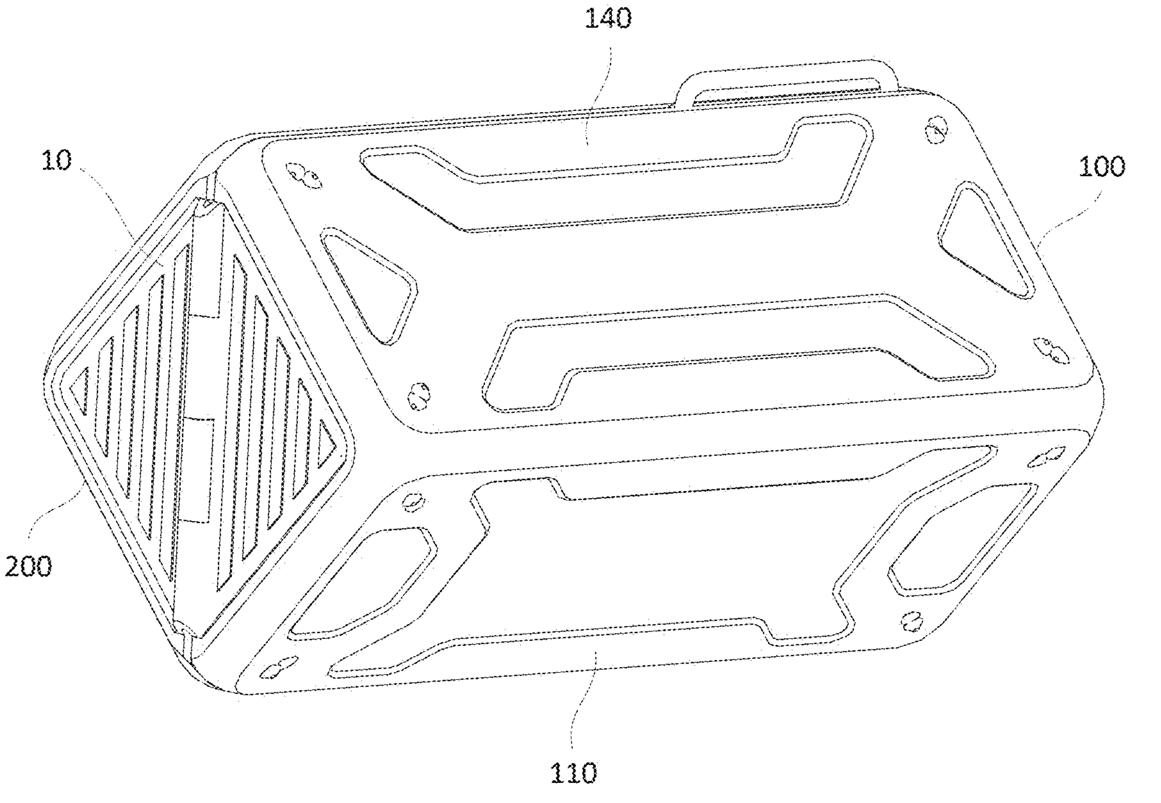
FIG. 3 is a schematic diagram of the tool box according to the embodiment of the present application in the closed state from another perspective.
Figure 4:
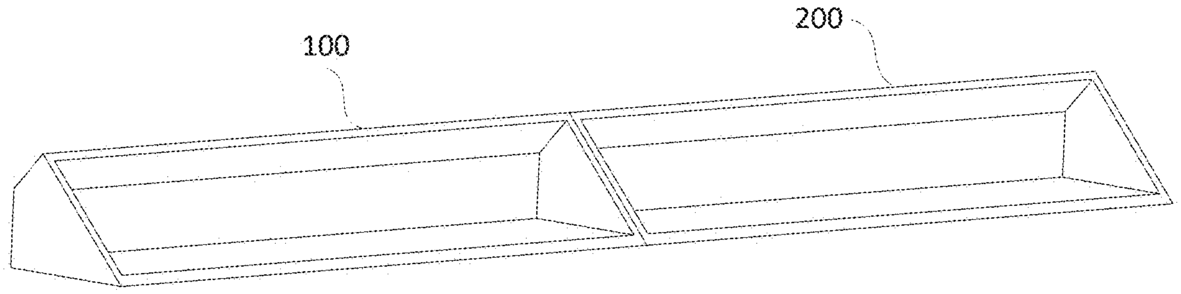
FIG. 4 is a schematic diagram of another tool box according to an embodiment of the present application placed in an open state.
Figure 5:
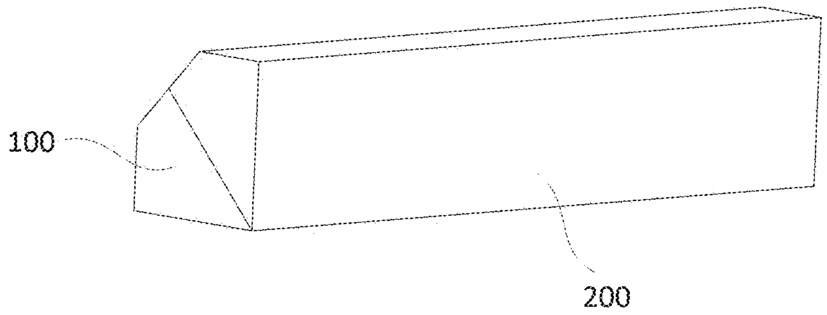
FIG. 5 is a schematic diagram of another tool box according to the embodiment of the present application in a closed state.
Figure 6:
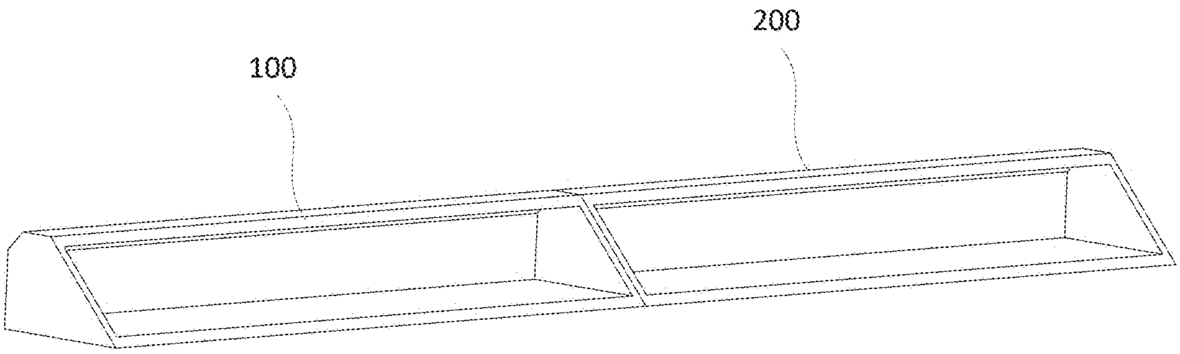
FIG. 6 is a schematic diagram of another tool box according to an embodiment of the present application placed in an open state.
Figure 7:
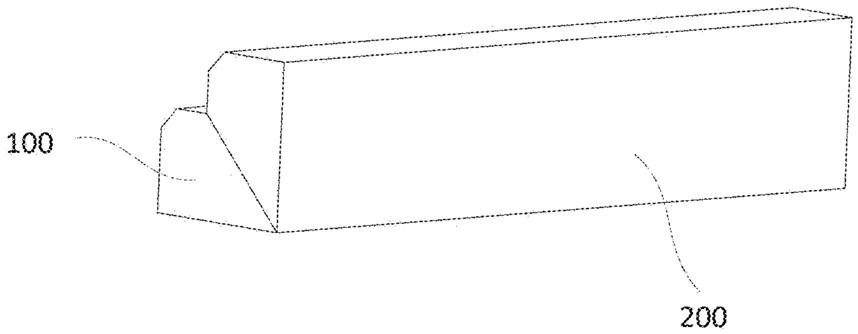
FIG. 7 is a schematic diagram of another tool box according to the embodiment of the present application in a closed state.
Figure 8:
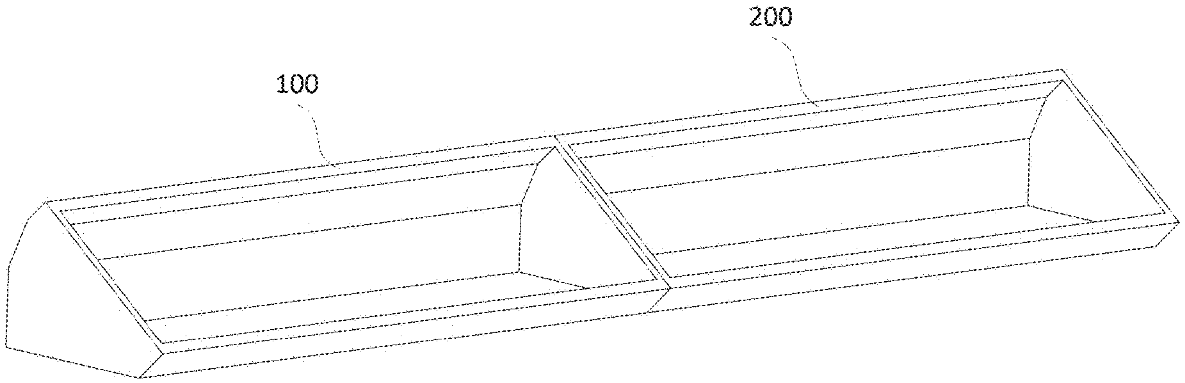
FIG. 8 is a schematic diagram of another tool box according to an embodiment of the present application placed in an open state.
Figure 9:
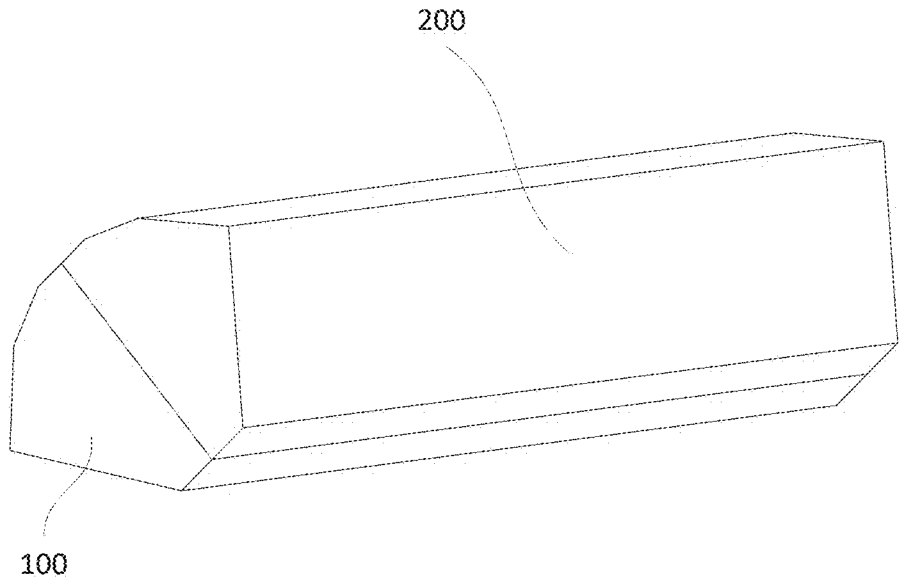
FIG. 9 is a schematic diagram of another tool box according to the embodiment of the present application in a closed state.

As shown in FIGS. 1, 2 and 3, a tool box provided by an embodiment of the present application includes a first box body 100 and a second box body 200 which mate together, that is, when the tool box is not in use, the first box body 100 and the second box body 200 mate together during placed, and when the tool box is in use, the first box body 100 and the second box body 200 are opened and placed on a workbench for use.

In this embodiment, the first box body 100 is provided with a first bottom surface 110 and a first mating surface 120, the first mating surface 120 being a surface on which a circumferential outer edge of an open end of the first box body 100 is located. The second box body 200 is provided with a second bottom surface 210 and a second mating surface 220, the second mating surface 220 being a surface, mating with the first mating surface 120, of the second box body 200. When the tool box is placed in an open state, that is, when the tool box is opened and placed on a table top of the workbench, the first bottom surface 110 is opposite to and placed on the table top, an angle between the first mating surface 120 and the first bottom surface 110 is not less than 20° and not more than 90°, the second bottom surface 210 is opposite to and placed on the table top, and an angle between the second mating surface 220 and the second bottom surface 210 is not less than 20° and not more than 90°. That is, when the tool box is placed in the open state, an opening of the tool box is inclined toward a user, thereby enabling the user to clearly observe tools inside the tool box at a glance when the tool box is placed at the rear part of the workbench, facilitating the user to take the tools; and when the tool box is placed in the open state, the first bottom surface 110 of the tool box serves as a supporting surface of the first box body 100, is placed on a table top of the workbench, and is in contact with the table top of the workbench to support the first box body 100, and the first mating surface 120 is inclined with respect to the first bottom surface 110, likewise, the second bottom surface 210 of the tool box serves as a supporting surface of the second box body 200, is placed on a table top of the workbench, and is in contact with the table top of the workbench to support the second box body 200, and the second mating surface 220 is inclined with respect to the second bottom surface 210. Compared with a tool box with a flat cuboid structure in the related art, the inner space of the first box body 100 and the second box body 200 is larger to allow a part of tools such as a screwdriver to be placed vertically or allow a liner to be placed obliquely (the liner is placed obliquely such that a tool placement surface of the liner is inclined at a certain angle). Therefore, when the tool box provided by the embodiments of the present application is placed at the rear part of the workbench, it is convenient for the user to clearly observe the tools in the tool box at a glance, thereby also facilitating the user to take the tools when the tool box is placed at the rear part of the workbench.

The tool box provided in this embodiment is adapted to be placed at the rear part of the workbench, and the user can also clearly observe the tools in the tool box for convenience when the tool box is placed at the rear part of the workbench. The tool box provided by the embodiments of the present application can reasonably utilize the space of the workbench, improving the space utilization rate at the rear part against the wall or the rear baffle of the workbench.

It should be noted that the table top in the embodiments of the present application may be a table top of the workbench, or other table tops as long as the tool box can be placed, which is not specifically limited here.

As shown in FIGS. 2 and 3, the tool box is provided with a first side surface 10 and a second side surface 20 which are opposite to each other, the first box body 100 is rotatably connected to the second box body 200 on the first side surface 10, and an opening of the first box body 100 and an opening of the second box body 200 are oriented the same when the tool box is placed in the open state. That is, when the tool box is placed in the open state, the openings of the first box body 100 and the second box body 200 are both inclined toward the user, which facilitates the user to take tools in the tool box. Furthermore, the first box body 100 is rotatably connected to the second box body 200 on the first side surface 10, and the opening of the first box body 100 and the opening of the second box body 200 are oriented the same when the tool box is placed in the open state, i.e., the first side surface 10 of the tool box on the first box body 100 is opposite to the second side surface 20 of the tool box on the second box body 200 when the tool box is placed in the open state, and the first box body 100 and the second box body 200 are side by side in a straight line.

In some embodiments of the present application, the first box body 100 further includes a first rear side surface 140, the first rear side surface 140 is located at a rear side of an open side of the first box body 100, the first rear side surface 140 is adjacent to the first bottom surface 110, and the first rear side surface 140 is perpendicular to the first bottom surface 110. The second box body 200 further includes a second rear side surface 240, the second rear side surface 240 is located at a rear side of an open side of the second box body 200, the second rear side surface 240 is adjacent to the second bottom surface 210, and the second rear side surface 240 is perpendicular to the second bottom surface 210. This arrangement makes the tool box be adapted to be placed at the rear part against the wall or the rear baffle of the workbench, when the tool box is placed in the open state, the first bottom surface 110 and the second bottom surface 210 of the tool box are placed on a table top of the workbench, the first rear side surface 140 and the second rear side surface 240 of the tool box are attached to a wall surface of the rear part against the wall of the workbench or the rear baffle of the workbench. This arrangement makes it possible to make reasonable use of the space at the rear part against the wall or the rear baffle of the workbench, thereby improving the space utilization rate at the rear part of the workbench.

As shown in FIGS. 1, 2 and 3, in some embodiments of the present application, the tool box has a cuboid structure, the first bottom surface 110, the second bottom surface 210, the first rear side surface 140 and the second rear side surface 240 are four side surfaces located between the first side surface 10 and the second side surface 20, and the first side surface 10 and the second side surface 20 are square. The angle between the first mating surface 120 and the first bottom surface 110 is 45°, and an angle between the second mating surface 220 and the first bottom surface 110 is 45°. That is, a mating line of the first mating surface 120 and the second mating surface 220 on the first side surface 10 is a diagonal of the first side surface 10, and a mating line of the first mating surface 120 and the second mating surface 220 on the second side surface 20 is a diagonal of the second side surface 20. This arrangement makes the tool box more beautiful and regular in appearance, is convenient for machining and assembling in structure, and the tool box with a cuboid structure is convenient for stacking a plurality of tool boxes.

In other embodiments of the present application, in addition to the cuboid structure, the tool box may have other structures, as shown in FIGS. 4, 5, 6, 7, 8 and 9, as long as the first bottom surface 110 and the second bottom surface 210 are placed on the table top, and the opening of the first box body 100 and the opening of second box body 200 are oriented toward the user, taking of the tools is also facilitated when the tool box is placed on the rear part of the workbench.

It should be noted that only the first box body 100 and the second box body 200 are illustrated in FIGS. 4, 5, 6, 7, 8 and 9, and a rotational connection structure, a latching mechanism and the like of the first box body 100 and the second box body 200 are not illustrated.

In some embodiments of the present application, the second side surface 20 is provided with a latching structure 300 configured to latch the first box body 100 and the second box body 200 together in a buckled state of the tool box. Exemplarily, the latching structure 300 in the embodiments of the present application may be a latching structure 300 latching the tool box in the related art, for example, snaps are disposed on the second side surface 20 of the first box body 100, clamping slots is disposed in the second side surface 20 of the second box body 200, the snaps and the clamping slots are in snap fit or sliding snap fit to latch the first box body 100 and the second box body 200 together, for another example, snaps are disposed on the second side surface 20 of the first box body 100, clamping protrusions are disposed on the second side surface 20 of the second box body 200, the snaps and the clamping protrusions are in snap fit to latch the first box body 100 and the second box body 200 together, and so on.

As shown in FIG. 1, in order to facilitate the orderly placement of the tools and taking and placement of the tools, the first box body 100 and the second box body 200 are each provided with a tool placement site. Illustratively, a first liner 130 is disposed within the first box body 100, and the first liner 130 is provided with at least one tool placement site for tools; and a second liner 230 is disposed within the second box body 200, and the second liner 230 is provided with at least one tool placement site for tools. The arrangement of the first liner 130 and the second liner 230 enables the tool box to set what type of tool to be placed inside according to the needs, that is, different liners are arranged inside a housing of the same tool box to assemble different combinations of tool sets, thereby making the tool sets contained in the tool box more diverse and flexible.

Illustratively, the tool placement site on the first liner 130 includes a handle placement site 151 in which a screwdriver handle 410 is placed and a plurality of screwdriver bit 420 placement sites in which screwdriver bits 420 are placed. The first liner 130 is provided with a plurality of steps 152. The handle placement site 151 is located on a front side of the plurality of steps 152, and a side on which an end, close to the first bottom surface 110, of the first mating surface 120 is located is the front side, that is, the side close to the user is the front side. The plurality of the screwdriver bit 420 placement sites are arranged in a plurality of rows and a plurality of columns, the number of rows of the screwdriver bit 420 placement sites is the same as the number of the steps 152, one row of screwdriver bit 420 placement sites is arranged on one step 152, and the screwdriver bit 420 placement sites are configured to vertically place screwdriver bits 420. This arrangement makes the placement of the screwdriver bits 420 gradually raised for easy taking and the vertically placed screwdriver is easy for the user to observe.

In some embodiments of the present application, the tool placement site on the first liner 130 further includes a magnetic plate placement site 153 for placing a magnetic positioning plate 470, the magnetic plate placement site 153 being a placement slot parallel to the first bottom surface 110, the magnetic plate placement site 153 being located at a front side of the handle placement site 151. That is, the magnetic plate placement site 153 is closer to the first bottom surface 110, and a depth extending from the first mating surface 120 to the first rear side surface 140 is higher at this position, making it suitable for placing a larger magnetic plate placement site 153, and making reasonable use of the space of the first box body 100. On one hand, it is convenient to take and store the magnetic positioning plate 470, on the other hand, the magnetic plate placement site 153 does not affect the setting of other placement sites.

With continued reference to FIG. 1, in some embodiments of the present disclosure, the second liner 230 is obliquely mounted within the second box body 200, and an angle of inclination of the second liner 230 with respect to the second bottom surface 210 is the same as an angle of inclination of the second mating surface 220 with respect to the second bottom surface 210. The tool placement site on the second liner 230 includes a pry bar 430 placement site, a prying blade 440 placement site, an elongated soft bar 450 placement site, and a tweezer 460 placement site. The inclined arrangement of the second liner 230 allows the tools placed on the second liner 230 to also be relatively inclined to facilitate the user to observe and take the tools in the second box body 200.

Illustratively, the tool placement site on the second liner 230 may also include a screen suction cup 480.

Other embodiments of the present application will be readily conceived by those skilled in the art after taking into account the description and practicing the present application disclosed herein. The present application is intended to cover any variations, uses or adaptive variations of the present application, and the variations, uses or adaptive variations follow the general principles of the present application and include the common general knowledge or conventional technical means in the art, which is not disclosed in the present application. The description and the embodiments are considered only exemplary, and the true scope and spirit of the present application are indicated by the following claims.

It should be understood that the present application is not limited to the precise structures that have been described above and shown in the drawings, and that various modifications and changes can be made without departing from the scope of the present application. The scope of the present application is limited only by the appended claims.

The invention claimed is:

1. A tool box, comprising a first box body and a second box body which mate together, wherein the first box body is provided with a first bottom surface and a first mating surface, the first mating surface being a surface on which a circumferential outer edge of an open end of the first box body is located;

the second box body is provided with a second bottom surface and a second mating surface, the second mating surface being a surface, mating with the first mating surface, of the second box body; and when the tool box is placed in an open state, the first bottom surface is opposite to a table top and placed on the table top, and an angle between the first mating surface and the first bottom surface is not less than 20° and not more than 90°; and the second bottom surface is opposite to the table top and placed on the table top, and an angle between the second mating surface and the second bottom surface is not less than 20° and not more than 90°;

wherein the first box body is provided with a tool placement site;

a first liner is disposed within the first box body, the first liner being provided with the tool placement site for tools;

the tool placement site on the first liner comprises a plurality of screwdriver bit placement sites in which screwdriver bits are placed;

the first liner is provided with a plurality of steps;

the plurality of the screwdriver bit placement sites are arranged in a plurality of rows and a plurality of columns, the number of rows of the plurality of screwdriver bit placement sites is the same as the number of the plurality of steps, one row of the plurality of screwdriver bit placement sites is arranged on one step.

2. The tool box according to claim 1, wherein the tool box is provided with a first side surface and a second side surface which are opposite to each other; and the first box body is rotatably connected to the second box body on the first side surface, and an opening of the first box body and an opening of the second box body are oriented the same when the tool box is placed in the open state.

3. The tool box according to claim 2, wherein the first box body further comprises a first rear side surface, the first rear side surface being located at a rear side of an open side of the first box body, the first rear side surface being adjacent to the first bottom surface, and the first rear side surface being perpendicular to the first bottom surface; and the second box body further comprises a second rear side surface, the second rear side surface being located at a rear side of an open side of the second box body, the second rear side surface being adjacent to the second bottom surface, and the second rear side surface being perpendicular to the second bottom surface.

4. The tool box according to claim 3, wherein the tool box has a cuboid structure, the first bottom surface, the second bottom surface, the first rear side surface and the second rear side surface are four side surfaces located between the first side surface and the second side surface, and the first side surface and the second side surface are square; and the angle between the first mating surface and the first bottom surface is 45°, and an angle between the second mating surface and the first bottom surface is 45°.

5. The tool box according to claim 2, wherein the second side surface is provided with a latching structure configured to latch the first box body and the second box body together in a buckled state of the tool box.

6. The tool box according to claim 1, wherein the second box body is provided with an additional tool placement site.

7. The tool box according to claim 6, wherein a second liner is disposed within the second box body, the second liner being provided with the additional tool placement site for tools.

8. The tool box according to claim 7, wherein the tool placement site on the first liner comprises a handle placement site in which a screwdriver handle is placed;

the handle placement site is located on a front side of the plurality of steps, and a side on which an end, close to the first bottom surface, of the first mating surface is located is the front side; and plurality of screwdriver bit placement sites are configured to vertically place screwdriver bits.

9. The tool box according to claim 8, wherein the tool placement site on the first liner further comprises a magnetic plate placement site for placing a magnetic positioning plate, the magnetic plate placement site being a placement slot parallel to the first bottom surface, the magnetic plate placement site being located at a front side of the handle placement site.

10. The tool box according to claim 7, wherein the second liner is mounted obliquely in the second box body, and an angle of inclination of the second liner with respect to the second bottom surface is the same as an angle of inclination of the second mating surface with respect to the second bottom surface; and the additional tool placement site on the second liner comprises a pry bar placement site, a prying blade placement site, an elongated soft bar placement site, and a tweezer placement site.

* * * * *